(12) United States Patent
Khoini-Poorfard

(10) Patent No.: US 7,580,481 B2
(45) Date of Patent: Aug. 25, 2009

(54) I/Q TIMING MISMATCH COMPENSATION

(75) Inventor: Ramin Khoini-Poorfard, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 842 days.

(21) Appl. No.: 10/836,775

(22) Filed: Apr. 30, 2004

(65) Prior Publication Data
US 2005/0243949 A1    Nov. 3, 2005

(51) Int. Cl.
*H04L 27/00* (2006.01)
(52) U.S. Cl. ........................... 375/324
(58) Field of Classification Search ........... 375/316, 375/322–324, 327, 354
See application file for complete search history.

(56) References Cited

U.S. PATENT DOCUMENTS

| | | | | |
|---|---|---|---|---|
| 4,345,241 | A * | 8/1982 | Takeuchi et al. | 341/118 |
| 6,744,829 | B1 * | 6/2004 | Mohindra | 375/343 |
| 6,959,016 | B1 * | 10/2005 | Keeth et al. | 370/517 |
| 7,158,586 | B2 * | 1/2007 | Husted | 375/324 |
| 2005/0135521 | A1 * | 6/2005 | Nemer et al. | 375/350 |

OTHER PUBLICATIONS

"High-Frequency Nonlinearity Analysis of Common-Emitter and Differential-Pair Transconductance Stages" Fong, Keng Leong and Robert G. Meyer. *IEEE Journal of Solid State Circuits*, vol. 33, No. 4, pp. 548-555. Apr. 1998.

"A 2.4 Monolithic Mixer for Wireless LAN Applications" Fong, Keng Leong and Robert G. Meyer. *IEEE Custom Integrated Circuits Conference*, pp. 9.4.1-9.4.4, May 1997.

"A Class AB Monolithic Mixer for 900 MHz Applications" Fong, Keng Leong, Christopher D. Hull, and Robert G. Meyer. *IEEE Journal of Solid-State Circuits*, pp. 1166-1172, Aug. 1997.

* cited by examiner

*Primary Examiner*—Kevin M Burd
(74) *Attorney, Agent, or Firm*—Trop, Pruner & Hu, P.C.

(57) ABSTRACT

Timing correction is affected for mismatch between channels in an I/Q demodulator. The respective demodulated I-channel and Q-channel are correlated and integrated so generate a timing control signal that is applied to a variable delay element. The variable delay element inserts a variable time delay in an ADC clock signal that is applied to either the I-channel ADC or the Q-channel ADC.

30 Claims, 4 Drawing Sheets

I/Q TIMING MISMATCH COMPENSATION

FIELD OF THE INVENTION

The invention relates generally to demodulation techniques and, more particularly, to a technique to correct timing mismatch between the channels of an I/Q demodulator.

BACKGROUND

I/Q (In-phase/Quadrature) modulators and demodulators are widely used in digital communications systems and are abundantly discussed in the technical literature. See, for example, Behzad Razavi, *RF Microelectronics*, Prentice Hall (1998) and John G. Proakis, *Digital Communications*, McGraw-Hill (1995). Examples of system applications that incorporate and standardize I/Q modulation and demodulation include the GSM (Global System for Mobile Communications), IS-136 (TDMA), IS-95 (CDMA), and IEEE 802.11 (wireless LAN). I/Q modulation and demodulation have also been proposed for use in short-range radio systems such as Bluetooth wireless communication systems.

Typically, in a receiver system that incorporates I/Q demodulation, the modulated carrier is simultaneously applied to an I-channel mixer and to a Q-channel mixer. A local oscillator (LO) is also applied to the mixers to effect frequency conversion to an intermediate frequency (IF). In an I/Q demodulator, the LO signal that is applied to this Q-channel mixer is offset by 90° from the LO signal that is applied to the I-channel mixer.

Image rejection is among the significant metrics by which the performance of a receiver system may be evaluated. In general, image rejection refers to the ability of the receiver to reject responses resulting from RF signals at a frequency offset from the desired RF carrier frequency by an amount equal to twice the IF of a dual-conversion receiver. For example, if the desired RF signal is at 100-MHz, and the receiver IF is 10.7 MHz, then the receiver LO will be tuned to 89.3 MHz. However, as is well known to those skilled in the art, the receiver will also exhibit a response to undesired RF signals (i.e., image signals) at a frequency 10.7 MHz below the LO frequency, in this case, 78.6 MHz. The receiver's response to the 78.6 MHz signal is referred to as the image response, because the image signal resides at a frequency opposite the LO frequency from the desired RF carrier, and offset from the LO frequency by the magnitude of the IF.

In the context of I/Q demodulator receivers, image rejection performance is known to be adversely affected by mismatch that is inevitably introduced between the I-channel and the Q-channel of the demodulator. In general, one or more of three distinct sources of mismatch may subsist between the I-channel and the Q-channel.

First, some degree of phase mismatch may be contributed by the LO signal. That is, the respective LO signals applied to the I-channel and to the Q-channel may not be offset by precisely 90°. Second, there may exist some mismatch in gain between the two channels. Gain mismatch may derive, for example, from differences in the conversion gains of the two mixers, and from asymmetry in the performance of gain stages, if any, in the respective channels. Differences in channel gain may also result from differences in the characteristics of the ADCs (analog-to-digital converters) in the channels. Third, there may exist delay (or timing) mismatches between the channels. Two sources contribute to timing delay: first, group delay differences between the respective channel filters and, second, sampling-time mismatch between the two ADCs, which, conventionally, are driven by a single ADC clock.

Although it is not uncommon for high-performance image-rejection mixers to incorporate some form of gain and/or phase mismatch compensation, there appears no entirely satisfactory technique to correct timing mismatch, particularly for systems in which the IF is relatively high, say 40 MHz or so. Accordingly, timing mismatch persists as a concern in the many emerging receiver system designs that are predicated on such IFs.

In receiver systems that incorporate a high IF, timing mismatch is particularly detrimental in that it becomes a source of significant degradation in image rejection. This is because, as the IF increases, the phase mismatch that results from a given timing mismatch increases accordingly. Conventional phase-mismatch correction techniques are unavailing as a solution. That is, available phase-correction techniques exhibit a capability to compensate for frequency-independent phase mismatch, such as, for example, a departure from the nominal 90° phase shift that is imparted to the LO inputs to a quadrature demodulator. However, timing mismatch is related to a non-ideal phase/frequency response, specifically, a phase response that does not vary linearly with frequency. Accordingly, a constant phase correction that is effective at a predetermined frequency of operation is unavailing in many systems where the channel bandwidth (e.g., 45 MHz) is comparable to the IF (e.g., 40 MHz). In addition, the use of a digital complex equalizer tends to be cost prohibitive and, nevertheless, only marginally effective. Accordingly, at present there appears no readily available technique to compensate for timing mismatch in I/Q demodulator systems.

SUMMARY OF THE INVENTION

The subject I/Q demodulation timing correction technique provides effective compensation for timing mismatch that may otherwise exist between the I-channel and the Q-channel of a receiver demodulator. Because the phase mismatch that results from a given timing mismatch increase with frequency, timing correction is particularly significant in receiving system design that are characterized by a high IF.

In one embodiment, an I/Q demodulator comprises an I-channel ADC and a Q-channel ADC. An ADC clock provides a sampling signal to each of the ADCs. The demodulator comprises means coupled to the ADC for correcting timing mismatch between the I-channel and the Q-channel.

In a further embodiment, a method for correcting timing mismatch correlation in an I/Q modulator comprises correlating an I-channel signal and a Q-channel signal. A timing signal is derived from the correlation and is applied to either the I-channel or the Q-channel so as to effect correction in the timing mismatch between the channels.

In another embodiment, a demodulator comprises a first channel to provide a first demodulated output and a second channel to provide a second demodulated output. A correlator is coupled to the first channel and to the second channel to provide a output indicative of a mismatch between the first channel and the second channel. A correction stage is coupled to the correlator to provide a correction signal to a channel so as to effect correction of the mismatch.

In a still further embodiment, a receiver system comprises a low-noise amplifier (LNA) to couple to an input signal source. A mixer is coupled to the LNA to provide an I-channel signal and a Q-channel signal. A quadrature demodulator is coupled to the mixer to provide a demodulated I-channel signal and a demodulated Q-channel signal. A correction circuit is coupled to the I-channel signal and to the Q-channel signal to correct a mismatch between the I-channel and the Q-channel.

BRIEF DESCRIPTION OF THE DRAWINGS

The subject I/O timing mismatch compensation technique may be better understood by, and its many features, advantages and capabilities made apparent to, those skilled in the art with reference to the Drawings that are briefly described immediately below and attached hereto, in the several Figures of which identical reference numerals (if any) refer to identical or similar elements, and wherein.

Figure 1:
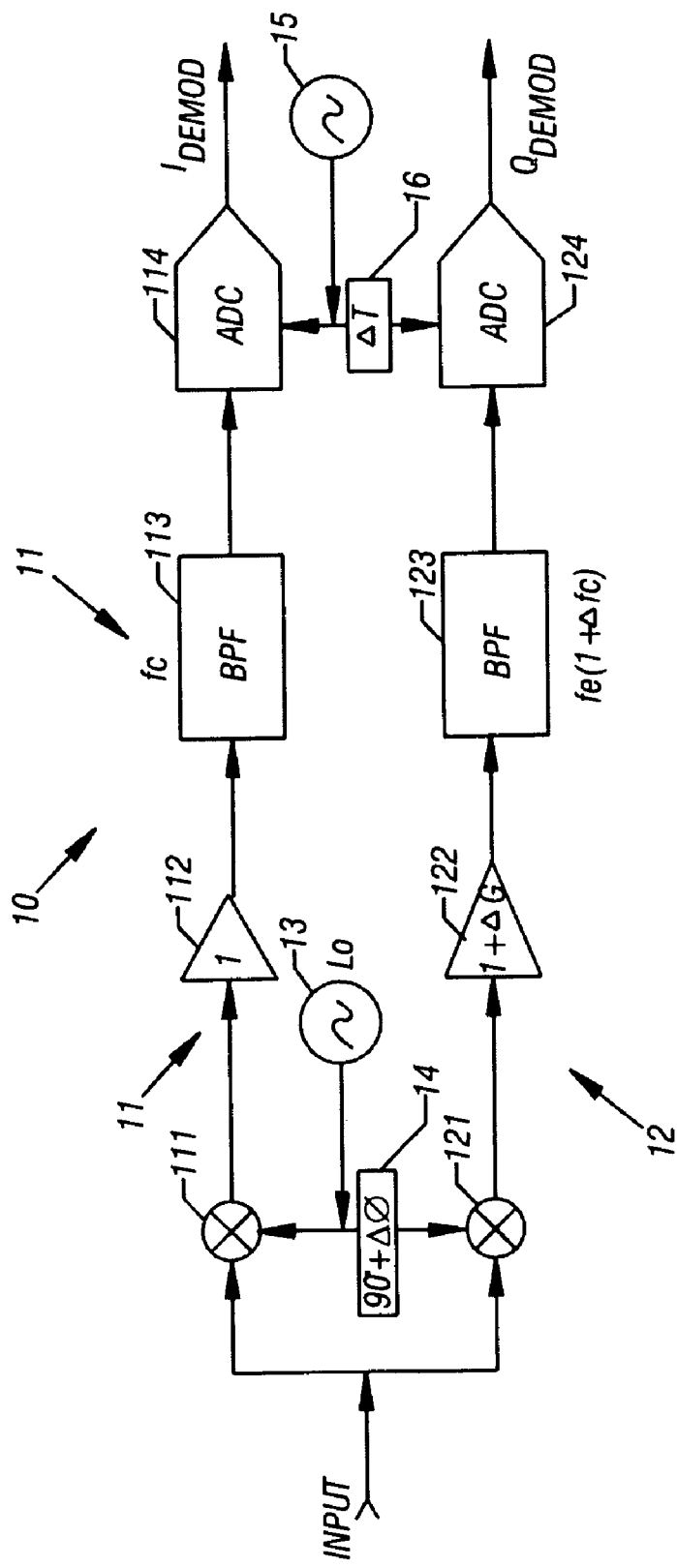
FIG. 1 is a block diagram of a conventional I/Q demodulator, illustrating, in particular, exemplary sources of phase, gain and timing mismatch between the I and Q-channel.

Skilled artisans appreciate that elements in Drawings are illustrated for simplicity and clarity and have not (unless so stated in the Description) necessarily been drawn to scale. For example, the dimensions of some elements in the Drawings may be exaggerated relative to other elements to promote and improve understanding of embodiments of the invention.

DETAILED DESCRIPTION

For a thorough understanding of the subject I/Q timing mismatch compensation technique, reference may be had to the following Detailed Description, including the appended Claims, in connection with the above described drawings.

Referring now to FIG. 1, depicted there is a simplified representation of a conventional I/Q demodulator 10, in which there is graphically represented a number of the potential sources of mismatch that may arise between a representative I-channel 11 and a representative Q-channel 12. As may be seen in FIG. 1, an input signal, in the form of a modulated carrier, is concurrently coupled to the I-channel and to the Q-channel. Specifically, the modulated input signal is coupled to an I-channel mixer 111 and to a Q-channel mixer 121. An output of an LO 13 is coupled directly to I-channel mixer 111 and through a quadrature phase shifter 14 to Q-channel mixer 121. Quadrature phase shifter 14 imparts a nominal 90° phase shift in the output of LO 13.

The output of mixer 111 is coupled to an I-channel bandpass filter (BPF) 113, and the output of mixer 121 is coupled to a Q-channel BPF 123. The Q-channel gain between mixer 111 and BPF 113 is represented by a gain block 112. Similarly, the Q-channel gain between mixer 121 and BPF 123 is represented by a gain block 122. Gain blocks 112 and 122 are intended to represent any lumped, or distributed, gain that may subsist in the I and Q-channels, respectively.

The output of I-channel BPF 113 is coupled to an I-channel demodulator stage, in the form of an ADC (analog-to-digital converter) 114. Similarly, the output of Q-channel BPF 123 is coupled to a Q-channel demodulator stage in the form of an ADC 124. Sampling operation of ADC 114 and ADC 124 is driven by an ADC clock 15.

In an ideal I/Q demodulator implementation, all circuit elements and stages represented in FIG. 1 would be uniformly matched and would exhibit mutually identical performance characteristics. However, in practicable implementations of I/Q demodulator 10, such is not the case. Significant sources of mismatch may obtain with respect to the I and the Q-channels. For example, quadrature phase shifter 14 may effect an offset phase (between the LO signal applied to mixer 111 and the LO signal applied to mixer 121) that is not precisely 90°. The mismatch resulting from this LO phase error is represented as $\Delta\Phi$ in FIG. 1. In addition, there may exist a mismatch between the relative gains of the I and the Q-channels. The channel gain mismatch is represented as a $\Delta G$ in gain block 122. Also, the frequency and phase response characteristics of BPF 113 may not precisely match those of BPF 123. This form of mismatch is represented as a deviation, $\Delta f_c$, from the nominal center frequency of the BPFs. Finally, the sampling operation performed by I-channel ADC 114 may not be precisely coincident with the sampling operation performed by Q-channel ADC 124. Numerous sources may contribute to the ADC sampling mismatch. These sources may inhere in ADC clock 15, in circuitry associated with the ADCs, in the coupling paths between ADC clock 15 and the ADCs, or elsewhere. For purposes of conceptual simplicity, a lumped ADC sampling mismatch 16 is represented as $\Delta T$ in FIG. 1. Sampling mismatch 16 may be considered a species of timing mismatch.

As suggested herein above, any mismatch that obtains with respect to the I-channel and the Q-channel signal processing functions will likely be manifested as a form of degradation or anomaly in receiver performance. Image rejection is a performance characteristic that suffers detectably from channel mismatch. Conversely, any technique that effects compensation for such a mismatch phenomena will concomitantly result in enhanced receiver performance. A technique for effecting I/Q timing mismatch is set forth FIG. 2.

Figure 2:
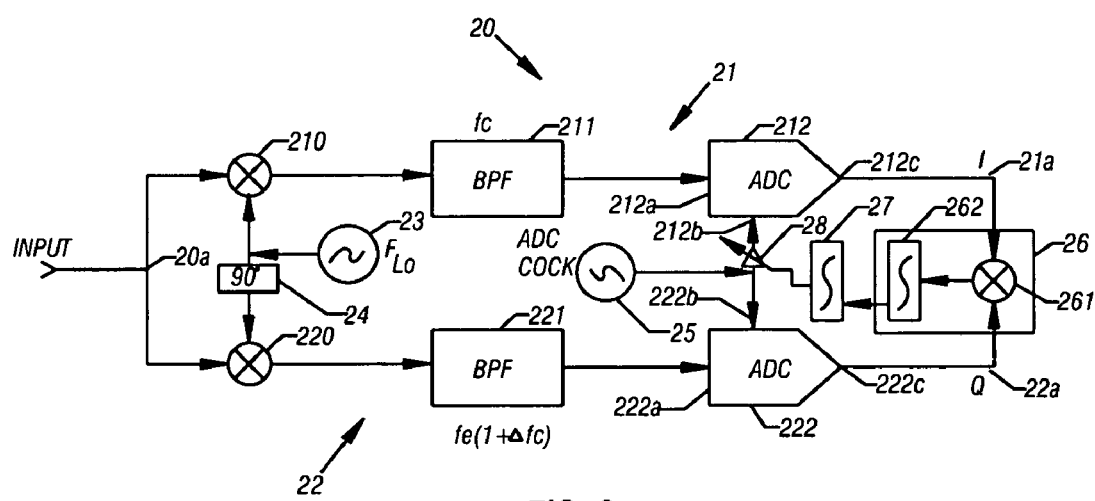
FIG. 2 is a block diagram of an embodiment of the invention that effects correction of timing mismatch between the I-channel and the Q-channels of a demodulator.

Referring now to FIG. 2, depicted there is an I/Q demodulator 20 in accordance with an embodiment of the invention. (Although not explicitly illustrated in FIG. 2, in one embodiment demodulator 20 is assumed to incorporate a conventional mechanism to effect phase correction. Such conventional phase correction techniques are not considered an aspect of the invention. Accordingly, the embodiment of FIG. 2 principally addresses a need to impart timing mismatch correction to an I/O demodulator.

I/Q demodulator 20 comprises, in a generally conventional manner, an I-channel 21 that, in turn, comprises an I-channel mixer 210, BPF 211 and ADC 212. I/Q demodulator 20 also comprises a Q-channel 22 that, in turn, comprises a Q-channel mixer 220, BPF 221 and ADC 222. A modulated carrier signal, $F_{IN}$, is coupled to a node 20a, and from there to respective inputs of mixers 210 and 220. In one embodiment, $F_{IN}$ may be a signal received from an antenna, for example. In some embodiments, the antenna signal may be coupled through an LNA and a bandpass filter at the frequency of the input carrier. An LO signal is provided by LO 23 and is coupled directly to mixer 210 and through a quadrature phase shifter 24 to mixer 220. (Of course, in an alternative embodiment, the LO input to mixer 210 (rather than mixer 220) may be subjected to the requisite 90° phase shift.) In one embodiment, the frequency of the LO signal may be offset from the frequency of the modulated RF carrier by, for example, 40 MHz. In a preferred embodiment, the LO signal frequency maybe positioned 40 MHz below the anticipated carrier frequency.

The outputs of mixers 210 and 220 are coupled to an I-channel BPF 211 and to a Q-channel BPF 221. If the IF is 40 MHz, the BPFs 211 and 221 will have a nominal center frequency of 40 MHz. Other characteristics of BPFs 211 and 221 may, for present purposes, be delegated to the purview of the skilled practitioner. Many of those characteristics in part depend on, for example, the spectral distribution of the modulated carrier.

The output of I-channel BPF 211 is coupled to I-channel ADC 212; and the output of Q-channel BPF 221 is coupled to Q-channel ADC 222. ADC 212 and ADC 222 are driven by a sampling ADC clock 25 that is coupled to sampling input 212*b* of ADC 212 and to sampling input 222*b* of ADC 222. The demodulated output of ADC 212 appears at an I-channel output node 21*a*; and the demodulated output of ADC 222 appears at a Q-channel output node 22*a*. In practice, the demodulated output of ADC 212 and ADC 222 experience additional and other filtering, signal processing and conditioning that are largely irrelevant to the subject invention.

In order to effect I/Q timing mismatch compensation in the manner suggested above, in one embodiment, demodulator 20 comprises a mechanism for correcting timing mismatch between I-channel 21 and Q-channel 22. The mechanism comprises a correlator 26 having inputs coupled to the respective I-channel and Q-channel outputs and to a variable delay stage 28. Delay stage 28 is seen in FIG. 2 to be coupled between ADC clock 25 and sampling input 212*b* of ADC 212. In a manner to be described below, variable delay stage 28 operates in response to correlator 26 to adjust the timing of the ADC clock signal that is applied to sampling input 212*b* of ADC 212, thereby effecting a variable time offset in the application of a sampling signal to ADC 212, with respect to the sampling signal applied to ADC 222.

Specifically, as may be seen with reference to FIG. 2, the I-channel output at node 21*a* is coupled to a first input a multiplier 261. The Q-channel output at node 22*a* is coupled to a second input of multiplier 261. The output of multiplier 261 is coupled to integrator 262 of correlator 26.

The output of correlator 26 is a signal that varies in accordance with the timing mismatch between the I-channel and the Q-channel. Specifically, because the correlator operates to integrate the product of the I-channel output and the Q-channel output, it will (ideally) provide a correlator output signal that is equal to the cosine of the phase difference between the I-channel and the Q-channel signals. If the two channels are perfectly matched, then this value is zero (cosine 90°=0). However, for imperfect channel matching, the correlator output is non-zero.

In this manner, the correlator output signal may be used to create a timing control signal to adjust the timing of the respective sampling signals applied to ADC 212 and to ADC 222 in a manner that corrects the timing mismatch. Specifically, in one embodiment, the correlator output signal is coupled to an integrator 27 and from there to a control input 28*c* of a variable delay stage 28. The timing control signal applied at input 28*a* establishes a corrective timing offset in the sampling signals applied to ADC 212 and ADC 222. That is, in response to the timing control signal, variable delay stage interposes a variable time delay in the sampling signal that is applied to ADC 212.

That is to say, to the extent that there exists timing mismatch between the I and the Q-channels, then correlator 26 will respond with a non-zero output. The correlator output is integrated by integrator 27 to effect a timing control signal that controls the delay imparted by delay stage 28. Steady-state operation is achieved when the control loop (comprising correlator 26, integrator 27, variable delay stage 28, and ADC 212) settles. In the steady state, the delay interposed by delay stage 28 is such that the input to integrator 27 is forced to zero. At this point, timing mismatch may be viewed as fully compensated. A particular embodiment of variable delay stage 28 is shown in FIG. 3.

Figure 3:
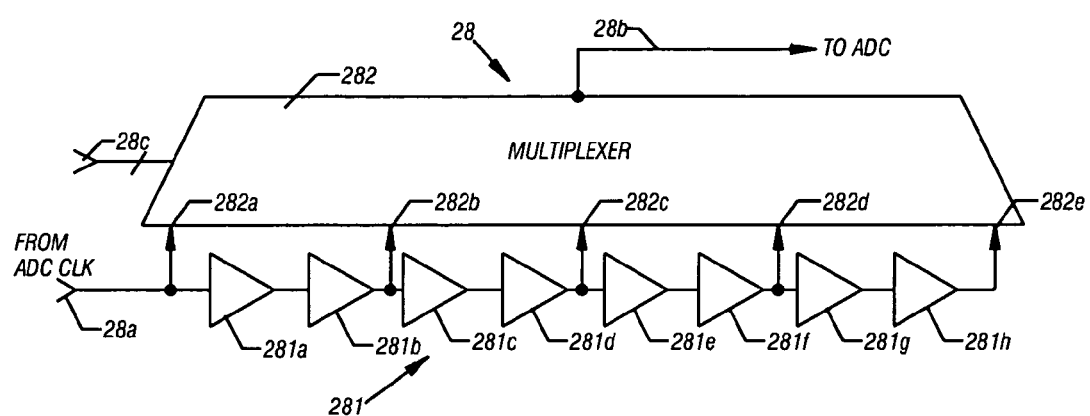
FIG. 3 is a circuit diagram of an exemplary implementation of a variable delay stage in accordance with an embodiment of the invention.

Referring now to FIG. 3, depicted there is a circuit diagram of an embodiment of variable delay stage 28. As represented in FIG. 3, delay stage 28 is seen to have a signal input 28*a* coupled to ADC clock 25 (not shown in FIG. 3), a control input 28*c* to receive a timing control signal from timing correction stage 26, and an output coupled to sampling input 212*b* of I-channel ADC 212. It should be noted that between the control input 28*c* of the multiplexer and the output of integrator 27, there may be included, in an embodiment, an ADC to convert the analog output of integrator 27 a digital multiplexer control. Alternatively, the I/Q correlation and the second integration may be implemented completely in the digital domain by processing the respective I and Q ADC digital outputs and producing a digital control line for the multiplexer, thereby eliminating the need for an additional ADC. The scope of the subject invention embraces each of the suggested approaches. In one respect, a completely digital approach may in some quarters be viewed as preferable in that it presents no DC offset to contend with, as may an analog integrator. However, skilled practitioners are well equipped to dispense with any difficulties associated with such a DC offset.

In one embodiment, delay stage 28 comprises a tapped delay line 281 coupled to a multiplexer 282. The input to tapped delay line 281 is provided by ADC clock 25 at an input node 28*a*. In one embodiment, tapped delay line 281 may be configured as a concatenated arrangement of fixed delay elements 281*a*, 281*b*, ..., 281*g* and 281*h*. In the embodiment of FIG. 3, eight (8) delay elements are illustrated; however the scope of the invention is not defined or limited by the number of delay elements, or by the structure of the discrete delay elements themselves. Principally for purposes of simplicity, delay elements 281*a*-281*h* are illustrated as integrated logic devices, e.g., inverters.

Time-delayed versions of ADC clock 25 are coupled to the respective inputs 282*a*, 282*b*, 282*c*, 282*d* and 282*e* of multiplexer 282. In one embodiment, first multiplexer input 282*a* is directly coupled to ADC clock 25. Successive inputs to the multiplexer are provided by the successively alternate outputs of the discrete delay elements, so that the multiplexer inputs are, respectively, the outputs of inverters 281*b*, 281*d*, 281*f*, and 281*h*. The number of delay elements (e.g., inverters that are concatenated to constitute a tap on delay line 281) is determined by the degree of granularity that is desired to be imparted to the time-delayed versions of the ADC clock 25, as well as by the time delay that results from propagation through a single delay element. Skilled practioners appreciate that the invention is not limited in this regard. Furthermore, as the number of discrete delay elements is increased (and the time delay contributed by each element decreased), the variable delay stage approaches equivalence to a continuously variable delay line. The scope of the invention, accordingly, encompasses an implementation that comprises a continuously variable delay stage.

Figure 4:
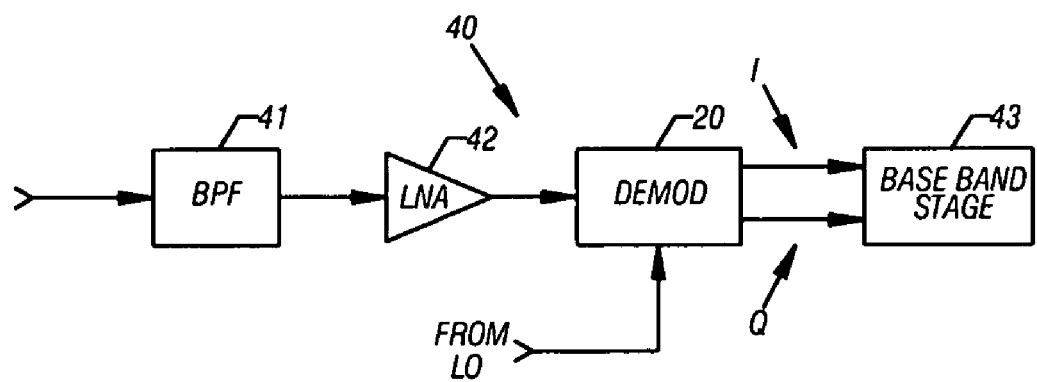
FIG. 4 is a block diagram of a receiver system in accordance with an embodiment of the invention.

The subject I/Q timing mismatch technique is attractive in numerous applications. For example, the apparatus may be used with salutary effect in a receiving system such as depicted in FIG. 4. The receiving system of FIG. 4 is representative in its salient aspects of receiving systems that may be used in connection with DBS (direct broadcast satellite) communications equipment and may be included in the familiar set-top box for satellite television systems.

As illustrated in FIG. 4, receiving system 40 comprises a low-noise amplifier (LNA) 42 that serves as front end of the receiver. LNA 42 is, in operation, coupled to an appropriate antenna (not shown). In one embodiment, receiver front end selectively may be enhanced with the inclusion of a bandpass filter (BPF) 41. The output of LNA 42 is frequency converted and demodulated in an I/Q demodulator 20, such as the demodulator described above and depicted in FIG. 2 and FIG. 3 herein. That is, demodulator 20 incorporates I/Q timing mismatch correction in accordance with embodiments set forth herein. The I-channel and Q-channel outputs of demodulator 20 are provided to baseband stage 43.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A demodulator comprising:
    an I-channel ADC to generate an I-channel signal from an I-channel input signal obtained from a modulated carrier signal received from an antenna;
    a Q-channel ADC to generate a Q-channel signal from a Q-channel input signal obtained from the modulated carrier signal received from the antenna;
    an ADC clock coupled to the ADCs to provide a sampling signal to each of the ADCs; and
    means coupled to the ADC clock for correcting a mismatch between an I-channel and a Q-channel by adjustment of a timing of the sampling signal to one of the ADC's, the means including a correlator coupled to receive the I-channel signal and the Q-channel signal and to generate a correlation output corresponding to a value of a phase difference between the received I and Q-channel signals to control the adjustment of the sampling signal timing based on the received I and Q-channel signals.

2. The demodulator defined in claim 1, wherein the means for correcting further comprises:
    a variable delay stage coupled to the ADC clock and to the correlator to adjust the timing of the sampling clock responsive to the correlation output.

3. The demodulator defined in claim 2, wherein the variable delay stage is operable to adjust the timing of the ADC clock so that an I-channel ADC clock signal is offset in time from a Q-channel ADC clock signal in a manner that corrects a mismatch between the I-channel and the Q-channel.

4. The demodulator defined in claim 3, wherein the variable delay stage comprises:
    a tapped delay line coupled to the ADC clock; and
    a multiplexer having a control input coupled to the correlator and an output coupled to the one of the ADCs.

5. The demodulator defined in claim 2, further comprising an integrator coupling the correlator to the variable delay stage.

6. The demodulator defined in claim 5, wherein the variable delay stage is operable to adjust the timing of the ADC clock so that an I-channel ADC clock signal is offset in time from a Q-channel ADC clock signal in a manner that corrects the mismatch between the I-channel and the Q-channel.

7. The demodulator defined in claim 6, wherein the variable delay stage comprises:
    a tapped delay line coupled to the ADC clock; and
    a multiplexer having a control input coupled to the correlator and an output coupled to a channel ADC.

8. The demodulator defined in claim 1, wherein the correlator has a first input coupled to the I-channel ADC and a second input coupled to the Q-channel ADC.

9. The demodulator defined in claim 8, wherein the means for correcting comprises means coupled to the correlator and to the ADC clock for adjusting timing of the ADC clock.

10. The demodulator defined in claim 9, wherein the means for adjusting comprises:
    a tapped delay line coupled to the ADC clock; and
    a multiplexer having a control input coupled to the correlator and an output coupled to a channel ADC.

11. The demodulator defined in claim 10, further comprising an integrator coupling the correlator to the means for adjusting.

12. A method for correcting timing mismatch in an I/Q demodulator, the method comprising:
    comparing an I-channel signal generated from a modulated input carrier signal and an Q-channel signal generated from the modulated input carrier signal, and integrating the comparison result to generate a correlator output signal equal to a cosine of a phase difference between the I and Q-channel signals;
    creating a timing control signal responsive to the correlator output signal by integrating the correlator output signal;
    applying the timing control signal to either an I-channel or an Q-channel of the demodulator so as to effect a correction in timing mismatch between the channels, wherein the I-channel comprises an I-channel ADC and the Q-channel comprises a Q-channel ADC and wherein the I-channel ADC and the Q-channel ADC are each coupled to an ADC clock;
    correlating an output of the I-channel ADC and an output of the Q-channel ADC;
    deriving a timing control signal from a correlation output;
    applying the timing control signal to a control input of a variable delay stage; and
    coupling the ADC clock to either the I-channel ADC or to the Q-channel ADC, through the variable delay stage.

13. The method as defined in claim 12, further comprising:
    coupling the I-channel signal to a first input of a correlator; and
    coupling the Q-channel signal to a second input of the correlator.

14. The method as defined in claim 13, further comprising:
    coupling an output of the variable delay stage to either the I-channel or the Q-channel.

15. The method as defined in claim 12, further comprising:
    coupling the I-channel signal to a first input of a correlator; and
    coupling the Q-channel signal to a second input of the correlator.

16. The method as defined in claim 12, further comprising:
    coupling an output of the variable delay stage to either the I-channel ADC or the Q-channel ADC.

17. The method as defined in claim 12, wherein the variable delay stage comprises a discrete-time delay cell.

18. The method as defined in claim 17, wherein the discrete-time delay cell comprises:
    a multiplexer having a signal input coupled to the ADC clock, a control input coupled to the timing control signal, and an output coupled to either the I-channel ADC or the Q-channel ADC.

19. The method as defined in claim 18, wherein the variable delay stage further comprises:
    a concatenated arrangement of discrete fixed-delay elements coupled to the signal input of the multiplexer.

20. The method as defined in claim 12, further comprising demodulating the I-channel signal and the Q-channel signal.

21. The method as defined in claim 12, further comprising receiving the modulated input carrier signal from an antenna coupled to the I/Q demodulator.

22. A demodulator comprising:
a first channel to provide a first demodulated output, the first channel including a first channel ADC to receive a first channel signal obtained from an incoming modulated carrier signal and to generate the first demodulated output therefrom;
a second channel to provide a second demodulated output, the second channel including a second channel ADC to receive a second channel signal obtained from the incoming modulated carrier signal and to generate the second demodulated output therefrom;
an ADC clock coupled to the first channel ADC and to the second channel ADC;
a correlator coupled to the first channel and to the second channel to provide an output indicative of a mismatch between the first channel and the second channel, the correlator including a first input coupled to an output of the first channel ADC and a second input coupled to an output of the second channel ADC, a multiplier having a first input coupled to the output of the first channel ADC and a second input coupled to the output of the second channel ADC, and an integrator coupled to an output of the multiplier to integrate the output to obtain a correlation output corresponding to a value of a phase difference between the first and second channel ADC outputs;
a second integrator coupled to the correlator output to integrate the correlator output to obtain a control signal; and
a correction stage coupled to the second integrator to provide a correction signal to a channel so as to effect correction of the mismatch responsive to the control signal, wherein the correction stage is operative to effect a controllable time delay in the ADC clock signal to one of the first and second channel ADCs, the correction stage including a delay stage having a first input coupled to the ADC clock, a second input coupled to the second integrator to receive the control signal, and an output coupled to the one of the first and second channel ADCs.

23. The demodulator defined in claim 22, wherein the ADC clock is coupled to a channel through the correction stage.

24. The demodulator defined in claim 22, wherein the correction stage comprises:
a concatenated delay stage having an input coupled to the ADC clock and having multiple outputs to provide time-delayed versions of the ADC clock; and
a multiplexer having a control input coupled to the second integrator, a signal input coupled to the concatenated delay stage; and an output coupled to the one of the first and second channel ADCs.

25. The demodulator defined in claim 22, wherein the delay stage comprises:
a plurality of concatenated delay elements having an input coupled to the ADC clock and having outputs to provide time-delayed versions of the ADC clock; and
a multiplexer having a control input coupled to the second integrator, a signal input coupled to the plurality of concatenated delay elements, and an output coupled to the one of the first and second channel ADCs.

26. A receiver system comprising:
a low-noise amplifier (LNA) to couple to an input signal source;
a mixer coupled to the LNA to provide an I-channel signal and a Q-channel signal from the input signal source;
a quadrature demodulator coupled to the mixer to provide a demodulated I-channel signal and a demodulated Q-channel signal; and
a correction circuit coupled to the I-channel signal and to the Q-channel signal to correct a mismatch between an I-channel and an Q-channel of the quadrature demodulator, the correction circuit to adjust a timing of sampling of one of the I-channel signal and the Q-channel signal responsive to a product of the demodulated I-channel signal and the demodulated Q-channel signal.

27. The receiver system defined in claim 26, wherein the correction circuit comprises:
a correlator having a first input coupled to an I-channel ADC and having a second input coupled to a Q-channel ADC; and
a variable delay stage having a first input coupled to an ADC clock, a second input coupled to the correlator, and an output coupled to one of the channel ADCs.

28. The receiver system defined in claim 27, further comprising:
an integrator coupling the correlator to the variable delay stage.

29. The receiver system defined in claim 28, wherein the variable delay stage comprises:
a plurality of concatenated delay elements having an input coupled to the ADC clock and having outputs to provide time-delayed versions of the ADC clock; and
a multiplexer having a control input coupled to the correlator, a signal input coupled to the outputs of the plurality of concatenated delay elements, and an output coupled to one of the channel ADCs.

30. The receiver system defined in claim 29, wherein the correlator comprises:
a multiplier coupled to the I-channel ADC and to the Q-channel ADC; and
an integrator coupled to the multiplier.

* * * * *